(12) United States Patent
Herrington et al.

(10) Patent No.: US 11,304,415 B2
(45) Date of Patent: Apr. 19, 2022

(54) WIRELESS CONTROL SYSTEM FOR OUTDOOR RECREATION MOTORS

(71) Applicant: Pinteal, LLC, North Richland Hills, TX (US)

(72) Inventors: Christian Herrington, Dallas, TX (US); Daniel Salzman, Chicago, IL (US); Christopher Leypoldt, North Richland Hills, TX (US)

(73) Assignee: Pinteal, LLC, North Richland Hills, TX (US)

( * ) Notice: Subject to any disclaimer, the term of this patent is extended or adjusted under 35 U.S.C. 154(b) by 0 days.

(21) Appl. No.: 15/931,537

(22) Filed: May 13, 2020

(65) Prior Publication Data

US 2020/0375175 A1    Dec. 3, 2020

Related U.S. Application Data

(60) Provisional application No. 62/856,051, filed on Jun. 1, 2019, provisional application No. 63/016,378, filed on Apr. 28, 2020.

(51) Int. Cl.
*A01M 31/06* (2006.01)
*G08C 17/02* (2006.01)
*H04W 4/80* (2018.01)

(52) U.S. Cl.
CPC ............ *A01M 31/06* (2013.01); *G08C 17/02* (2013.01); *H04W 4/80* (2018.02)

(58) Field of Classification Search
CPC ......... A01M 31/06; H04W 4/80; G08C 17/00
USPC ....................................................... 43/2, 3
See application file for complete search history.

(56) References Cited

U.S. PATENT DOCUMENTS

| 5,809,683 | A | 9/1998 | Solomon | |
|---|---|---|---|---|
| 6,092,323 | A | 7/2000 | McBride | |
| 6,212,816 | B1* | 4/2001 | Babbitt | A01M 31/06 43/3 |
| 8,188,691 | B1* | 5/2012 | Twohig | A01M 31/06 318/139 |

(Continued)

OTHER PUBLICATIONS

Tknight006, Mojo (Remote vs. No Remote), online forum, retrieved online on Mar. 11, 2020 from <https://www.duckhuntingchat.com/forum/viewtopic.php?f=15&t=159726>, published on 2011, 3 pages.

(Continued)

*Primary Examiner* — Adnan Aziz
(74) *Attorney, Agent, or Firm* — Craige Thompson; Thompson Patent Law; Timothy D. Snowden

(57) ABSTRACT

Apparatus and associated methods relate to an integrated and packaged control system that can be implemented in and compatible with different types of decoys such that the decoys can be remotely controlled via a user's personal computing device. In an illustrative example, the control system may include a package that houses a package that houses a processing engine, a communication interface, a connector, and a data store. The data store may contain different settings of different types of decoys and corresponding control signals. The input/output terminal may be configured to communicate electrical signals between the interior of the package and the exterior of the package. By providing the control system, different types of decoys may be controlled remotely.

20 Claims, 13 Drawing Sheets

(56) References Cited

U.S. PATENT DOCUMENTS

| | | | | |
|---|---|---|---|---|
| 8,713,846 | B1* | 5/2014 | Thrash | A63H 11/10 43/2 |
| 9,538,744 | B1 | 1/2017 | Campbell et al. | |
| 10,321,674 | B1 | 6/2019 | Goodwin | |
| 2009/0188148 | A1* | 7/2009 | Orris | A01M 31/06 43/3 |
| 2016/0198702 | A1 | 7/2016 | Forrester | |
| 2016/0205921 | A1* | 7/2016 | Janzen, Jr. | A01M 31/06 |
| 2017/0142960 | A1 | 5/2017 | Patterson | |
| 2017/0332620 | A1* | 11/2017 | Noe | G01G 19/03 |
| 2017/0339942 | A1* | 11/2017 | Van Grinsven | A01M 31/06 |
| 2019/0116782 | A1* | 4/2019 | Hanson | A01M 31/06 |
| 2019/0183112 | A1 | 6/2019 | Fick et al. | |
| 2019/0250602 | A1* | 8/2019 | DeLoach, III | B63B 22/00 |
| 2020/0077640 | A1* | 3/2020 | Jarboe | A01M 31/06 |
| 2020/0146279 | A1* | 5/2020 | Young | A01M 31/06 |
| 2020/0383316 | A1* | 12/2020 | Noe | A01M 31/06 |

OTHER PUBLICATIONS

Wtrfowl07, Will Mojo Remote Work in a Baby Mojo? online forum, retrieved online on Mar. 11, 2020 from <https://www.duckhuntingchat.com/forum/viewtopic.php?f=15&t=155615>, published on 2009, 4 pages.

Wendlwacker, Anyone had problems with a lucky duck remote? online forum, retrieved online on Mar. 11, 2020 from <https://www.iawaterfowlers.com/34492/update-anyone-had-problems-lucky-duck-remote>, published on 2008, 5 pages.

Salmo's Dog, Mojo Remote Question, online forum, retrieved online on Mar. 11, 2020 from <https://www.michigan-sportsman.com/forum/threads/mojo-remote-question.309397/>, published on 2009, 10 pages.

Wabasher, Spinning Wing Decoy Remote ???? online forum, retrieved online on Mar. 11, 2020 from <https://www.refugeforums.com/threads/spinning-wing-decoy-remote.192976/>, published on 2003, 3 pages.

Tweedlap, Remote on/off for Spinning Wing Decoys, online forum, retrieved online on Mar. 11, 2020 from <https://fishingminnesota.com/forums/topic/124723-remote-onoff-for-spinning-wing-decoys/>, published on 2008, 3 pages.

12V Monster, 1x Remote 1x Receiver DC 6V Latching Single Channel W Control ON OFF Switch Set—Duck Decoy, retrieved online on Mar. 11, 2020 from <https://www.12vmonster.com/products/dc-6v-12v-remote-control-wireless-on-off-switch-set-remote-receiver-6volt-12volt-power-relay>, 5 pages.

* cited by examiner

FIG. 4A

WIRELESS CONTROL SYSTEM FOR OUTDOOR RECREATION MOTORS

CROSS-REFERENCE TO RELATED APPLICATIONS

This application claims the benefit of U.S. Provisional Application Ser. No. 62/856,051, titled "Wireless Control System for Outdoor Recreation Motors," filed by Christian James Herrington, et al., on Jun. 1, 2019.

This application also claims the benefit of U.S. Provisional Application Ser. No. 63/016,378, titled "Control System," filed by Christian Herrington, et al., on Apr. 28, 2020.

This application incorporates the entire contents of the foregoing application(s) herein by reference.

TECHNICAL FIELD

Various embodiments relate generally to a control system for output recreation motors, particularly wireless control systems compatible with different decoys to control the operations of the decoys.

BACKGROUND

Animal decoys are used in the field for hunting and other wildlife management applications. With respect to fowl (e.g., geese, ducks, turkey), decoys with articulating or motion-ready components reshaped the outdoor industry by adding realism to the decoy, which increases hunter or wildlife managers success in engaging the animal(s) desired.

Prior to 2000, decoy technology or waterfowl was largely based on flotation capabilities and general ornamentation; however, these characteristics provided a decoy that was still and lifeless, demonstrating no motion beyond that provided from conditions in the field. In 1996 & 1999, two versions of the spinning wing-motion decoy were invented, which introduced spinning wings of the fowl decoy. The more advanced wing motion decoys incorporated a battery-powered motor and increased the realism of the decoy. As a result, a notable increase in the success of the decoy was realized by hunters and wildlife management users. As spinning decoys proliferated, fowl became wary of the constant motion and learned to "flare" from spreads with spinning decoys. Because the decoy motion could not be controlled (e.g., motion could not be throttled due to a lack of an on/off feature), the success of this improvement was limited as birds avoided objects demonstrating constant wing motion.

Following the advent of the binary controlled decoys (i.e., on/off control switch only), remote-controlled decoys were developed to provide longer-distance control of the decoy motion, along with capabilities for motion control by intermittent timers. These technology improvements provided advantages to hunters and wildlife management users. However, the remote-controlled decoys were designed for model-specific compatibility and provided a narrow range of utility for users operating a range of decoy models.

SUMMARY

Apparatus and associated methods relate to an integrated and packaged control system that can be implemented in and compatible with different types of decoys such that the decoys can be remotely controlled via a user's personal computing device. In an illustrative example, the control system may include a package that houses a package that houses a processing engine, a communication interface, a connector, and a data store. The data store may contain different settings of different types of decoys and corresponding control signals. The input/output terminal may be configured to communicate electrical signals between the interior of the package and the exterior of the package. By providing the control system, different types of decoys may be controlled remotely.

Various embodiments may achieve one or more advantages. For example, some embodiments may provide an easy and effective way to modify an existing decoy to be remotely controlled. In some embodiments, the user may be able to control multiple decoys simultaneously through only one user interface. In some embodiments, the control system may include a connector, a reverse voltage protection circuit, and a voltage regulator. Therefore, the control system may be compatible with different types/models of decoys. For example, a user may put the control system in a first type of decoy, and after finishing using the first type of decoy, the user may also put the same control system in a second type of decoy to enable the second type of decoy to be also controlled remotely. In some embodiments, the control system may advantageously provide additional intelligence and functional capability for substantially any analog, battery-powered motor driven device. The computing system (e.g., processor) within the control system may provide flexibility to use environmental factors (i.e. temperature) to drive optimum performance settings. In some embodiments, this open-loop control system may also use feedback from the smartphone application (e.g., phone Apps may provide input (e.g., cloud cover, rainfall, weather patterns)) to drive the system.

The details of various embodiments are set forth in the accompanying drawings and the description below. Other features and advantages will be apparent from the description and drawings, and from the claims.

BRIEF DESCRIPTION OF THE DRAWINGS

FIGS. 4A-4E depict exemplary connectors implemented in the wireless control system.

Like reference symbols in the various drawings indicate like elements.

DETAILED DESCRIPTION OF ILLUSTRATIVE EMBODIMENTS

Figure 1:
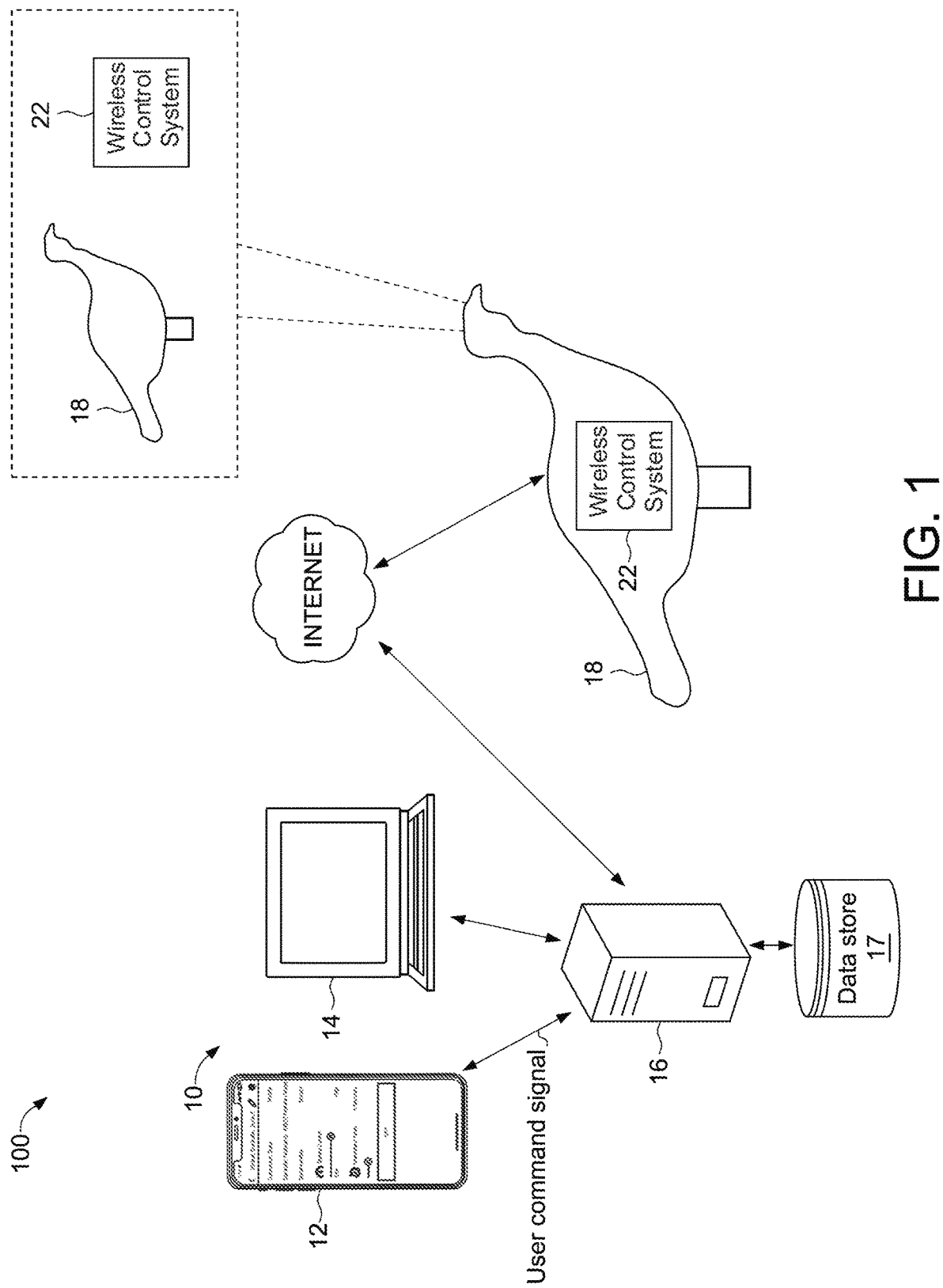
FIG. 1 depicts an exemplary wireless control system employed in an illustrative use-case scenario.

FIG. 1 depicts an exemplary wireless control system employed in an illustrative use-case scenario. As seen in reference to FIG. 1, an exemplary wireless control system 22 is placed in, for example, a decoy 18. The wireless control system 22 may be controlled by a personal computing device 10 (e.g., mobile phone 12 or other computing devices 14). In this illustrative scenario, a user puts the wireless control system 22 into the decoy 18 and connects the wireless control system 22 with existing elements (e.g., motors, battery, and harness) in the decoy 18 through a connector (not shown) implemented in the wireless control system 22. By implementing the wireless control system 22 into a decoy (e.g., the decoy 18), the user may advantageously use the personal computing device 10 to control the decoy (e.g., movement of the decoy) remotely.

In some embodiments, the personal computing device 10 may be operatively connected to the internet via a communication server 16. The communication server 16 may be coupled to a data store 17. The data store 17 may include instructions that, when executed by the communication server 16, cause the communication server 16 to perform predetermined operations. By providing the removable and integrated wireless control system, a user may advantageously make a non-remote controllable decoy into a decoy that can be remotely controlled.

In this depicted example, the wireless control system 22 operatively connects the game decoy 18 to the internet and the personal computing device 10 such that the personal computing device 10 may control the movement and related features of the decoy 18. The control signals may be communicated via Hypertext Transfer Protocol (HTTP), which is an application protocol for distributed, collaborative, hypermedia information systems. The wireless control system 22 connects to the internet and executes the logic written in the application firmware. In some embodiments, the wireless control system 22 may be configured with a Bluetooth chip to connect with the personal computing device 10 and transmit/receive signals to/from the personal computing device 10. Exemplary architectures of the wireless control system 22 are discussed in further detail with reference to FIGS. 2A-3.

In some embodiments, various user-defined parameters can be set, for example, over the air through the user's phone (e.g., a corresponding phone App or web interface). For example, the user may preset different operation modes (e.g., corresponding to different movements) and select a mode before and/or during the operation of the decoy.

In some embodiments, the phone App may be used to control multiple wireless control systems 22 (e.g., simultaneously or not) using a single interface. For example, a number of (e.g., more than two) wireless control systems may be installed in a number of decoys, respectively. These decoys may be placed in a "set". The user may use only one personal computing device (e.g., mobile phone) to control the set of decoys to perform the same operations. An exemplary scenario is discussed with reference to FIG. 6.

Figure 2A:
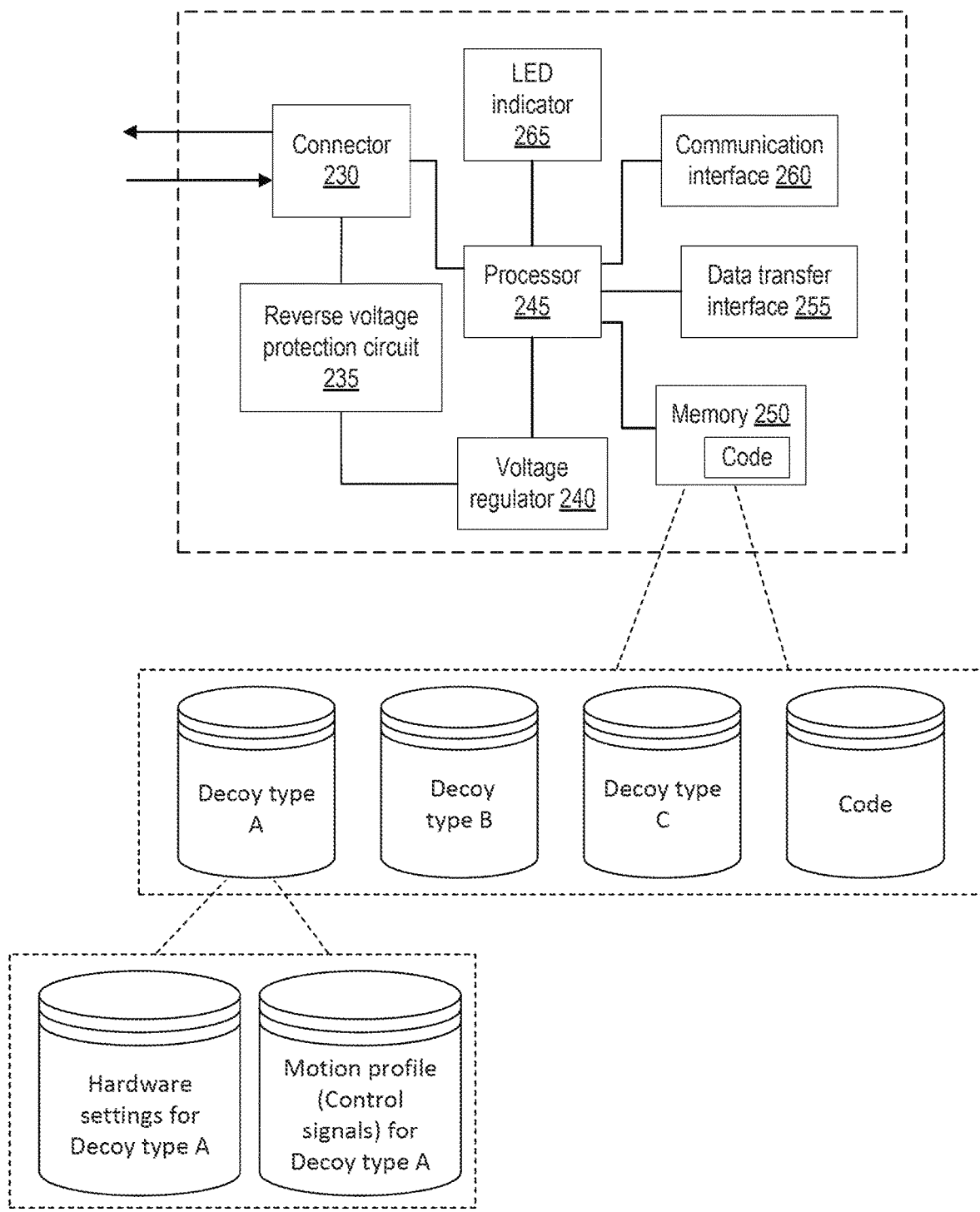
FIG. 2A depicts a block diagram of an exemplary wireless control system.

FIG. 2A depicts a block diagram of an exemplary wireless control system. In this illustrated example, the wireless control system 22 includes a connector 230 configured to provide electrical connections between the decoy 18 and the wireless control system 22. The connector 230 may be connected with decoys with and without harnesses. Two exemplary connections between the wireless control system 22 and the decoy 18 are discussed in detail with reference to FIG. 2B and FIG. 2C, respectively. Exemplary architecture of the connector 230 are described in further detail with reference to FIGS. 4A-4E.

The wireless control system 22 also includes a reverse voltage protection circuit 235 and a voltage regulator 240 configured to receive power from the battery 210 and provide a stable power supply for the features in the wireless control system 22. More specifically, the reverse voltage protection circuit 235 may advantageously reduce or prevent damage to power supplies (e.g., the battery 210) and electronic circuits (e.g., the motors and electrical devices in the wireless control system 22) in the event of a reverse voltage applied at the input or output terminals. The voltage regulator 240 may be designed to automatically maintain a constant voltage level and stabilize the DC voltages used by the wireless control system 22 (e.g., the processor 245 and other elements).

The wireless control system 22 also includes a processor 245 configured to perform operations. For example, the processor 245 may determine which decoy model is connected to the wireless control system 22, and/or whether the wireless control system 22 has received a user command signal.

The processor 245 is also coupled to memory 250 (e.g., non-volatile memory (NVM). The NVM 250 may store instructions that, when executed by the processor 245, cause the processor 245 to perform operations to, for example, provide control signals to control the decoy. In some embodiments, the operations may include receiving command signals from the user's device (e.g., mobile phone, personal computer). The operations may also include sending notifications (e.g., low battery notification) via, for example email or text, to users. The NVM 250 may also be configured to store settings for different models of decoys (e.g., decoy model A, decoy model B, decoy model C). The settings may include hardware settings of the decoy. For example, the settings may include the battery characteristic used by this type of decoy, motors (e.g., number of motors, positions, models, and functions), and supported modes (e.g., normal movement mode, fast movement mode), for example. The NVM 250 may also be configured to store various motion profiles related to the corresponding decoy model. Each motion profile may include one or more control signals to be applied to the one or more motors of the corresponding decoy. The control signals may enable the decoy to turn the head, spin wrings at a predetermined frequency, the speed, for example. In some embodiments, the motion profiles may be programmed and updated. In some embodiments, the user may also set intermittent timer through the personal computing device 10 to control the operation time duration of the decoy.

The settings for different models of decoys may be updated over the internet. More models of decoys' settings may be added into the NVM 250 over the internet or through the data transfer interface 255.

The wireless control system 22 also includes a data transfer interface 255 (e.g., USB I/O ports). The data transfer interface 255 may be configured to receive/transmit data from/to an outside data storage device (e.g., flash drive, cloud). The USB I/O ports may also be used to receive and transmit data with other devices.

The wireless control system 22 also includes a communication interface 260 operably connected to the processor 245. In some embodiments, the communication interface 260 may allow a direct communication between the wireless control system 22 and the personal computing device 10 over cellular service. In some embodiments, for example, RFID tags, Bluetooth tags, Wi-Fi tags, ZigBee tags may be linked to the wireless control system 22 to more affordably control multiple decoys, or to be used as a Gateway to the Internet of Things (IoT). In some embodiments, the communication interface 260 may be use Bluetooth Low Energy (BLE) to provide the communication between the wireless control system 22 and the personal computing device 10.

The wireless control system 22 also includes a LED indicator 265. In some embodiments, the LED indicator 265 may include one or more LEDs. The status (e.g., on, off, brightness levels, refresh rate) of the LEDs may be controlled by the processor 245 to provide different information (e.g., battery status and/or work mode of the wireless control system 22) for the user. For example, the LED indicator 265 may be configured to generate lights with different colors, flash with different frequencies, and/or turn on/off different numbers of LEDs to provide different information. For example, the numbers of the LEDs generating green light may indicate the power level of the battery module 210. The LED indicator 265 may include, for example, four LEDs. When all the four LEDs are generating green lights, a user may tell that the power level of the battery module 210 is full. Flashlights generated by the LED indicator 265 may be remotely controlled (e.g., through a phone App) to toggle on/off, which might have a variety of uses. In some embodiments, the user may also remotely configure (e.g., through the phone App) the wireless control system 22 to make the LED indicator 265 flash such that the user may find the decoy 18 quickly (e.g., in a dark place). In some embodiments, the LED indicator 265 may include a first set of LEDs and a second set of LEDs. The first set of LEDs may be used to show the battery status, and the second set of LEDs may be used to toggle on/off to indicate the location of the decoy 18 for the user.

The wireless control system 22 also includes a package 270 configured to house the connector 230, the reverse voltage protection circuit 235, the voltage regulator 240, the processor 245, the memory 250, the data transfer interface 255, the communication interface 260, and the LED indicator 265. Therefore, a user may implement this wireless control system 22 with different models of decoys to easily reconfigure the decoys such that the decoys may be controlled remotely. When combining wireless control system 22 with the decoy 18, the hunter may get a moving, lifelike, animated decoy that can be remotely controlled and updated over the internet.

The processor 245 may be implemented on the same die alone or in combination with one or more companion die, which may, for example, be arranged in a package, or on a common substrate (e.g., hybrid circuit, printed circuit board, or semiconductor die). In some embodiments, the wireless control system may also include a motor driver coupled to the processor to send control signals to the motors in the decoy.

Figure 2B:
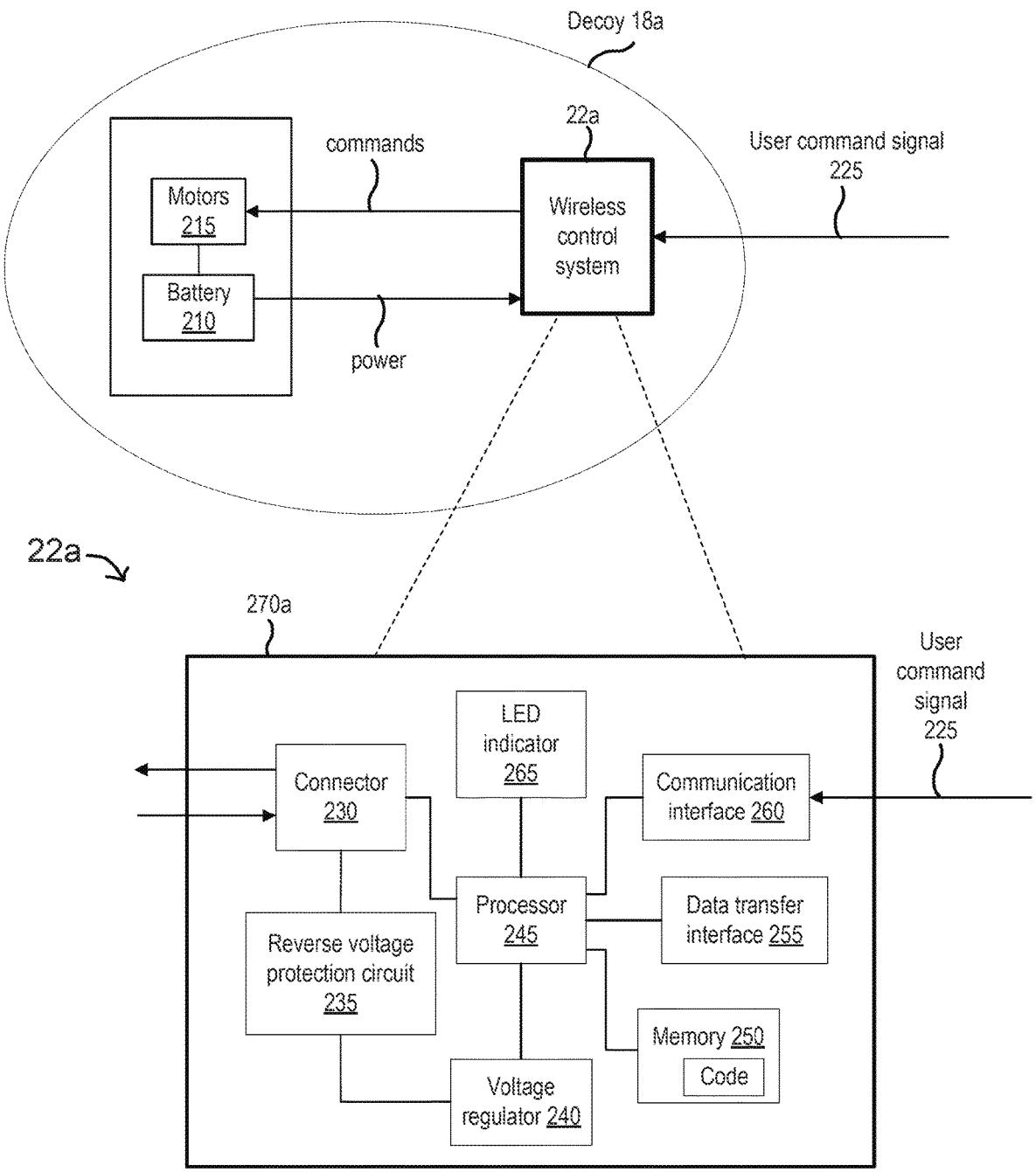
FIG. 2B depicts a block diagram of an exemplary wireless control system employed in an exemplary decoy.

FIG. 2B depicts a block diagram of an exemplary wireless control system employed in an exemplary decoy. In this illustrated example, an exemplary decoy 18a provides an enclosure for a battery 210, and one or more motors 215 used throughout the decoy 18a. The battery and the motors 215 are connected through, for example, electrical wires. The battery 210 may be rechargeable and may include solar recharger for the battery 210.

In this depicted example, a wireless control system 22a is put into the decoy 18 to receive power from the battery 210 and send control signals to control the motors 215 of the decoy 18. The wireless control system 22 may apply different control signals to the decoy 18 in response to the user command signal 225 and the characteristics (e.g., the type/model of the decoy) of the decoy 18a. The connector 230 in the wireless control system 22a may be directly connected with the battery 210 to receive power supply, and the motors 215 to send control signals, for example. By implementing the wireless control system 22a, even if the initial decoy 18a doesn't have any existing remote features, movement features of the decoy 18a provided by the motors 215 may be triggered by signals from the wireless control system 22a. The motors 215 may be, for example, servo motors or stepper motors, which provide movement to one or more movable body parts of the decoy 18a. The motors 215 may provide mechanical movements to the decoy body, that may for example, twist the head from right to left, when commanded to by the wireless control system 22a after receiving a user input (e.g., a user command signal 225) via a user interface UI on the personal computing device 10.

Figure 2C:
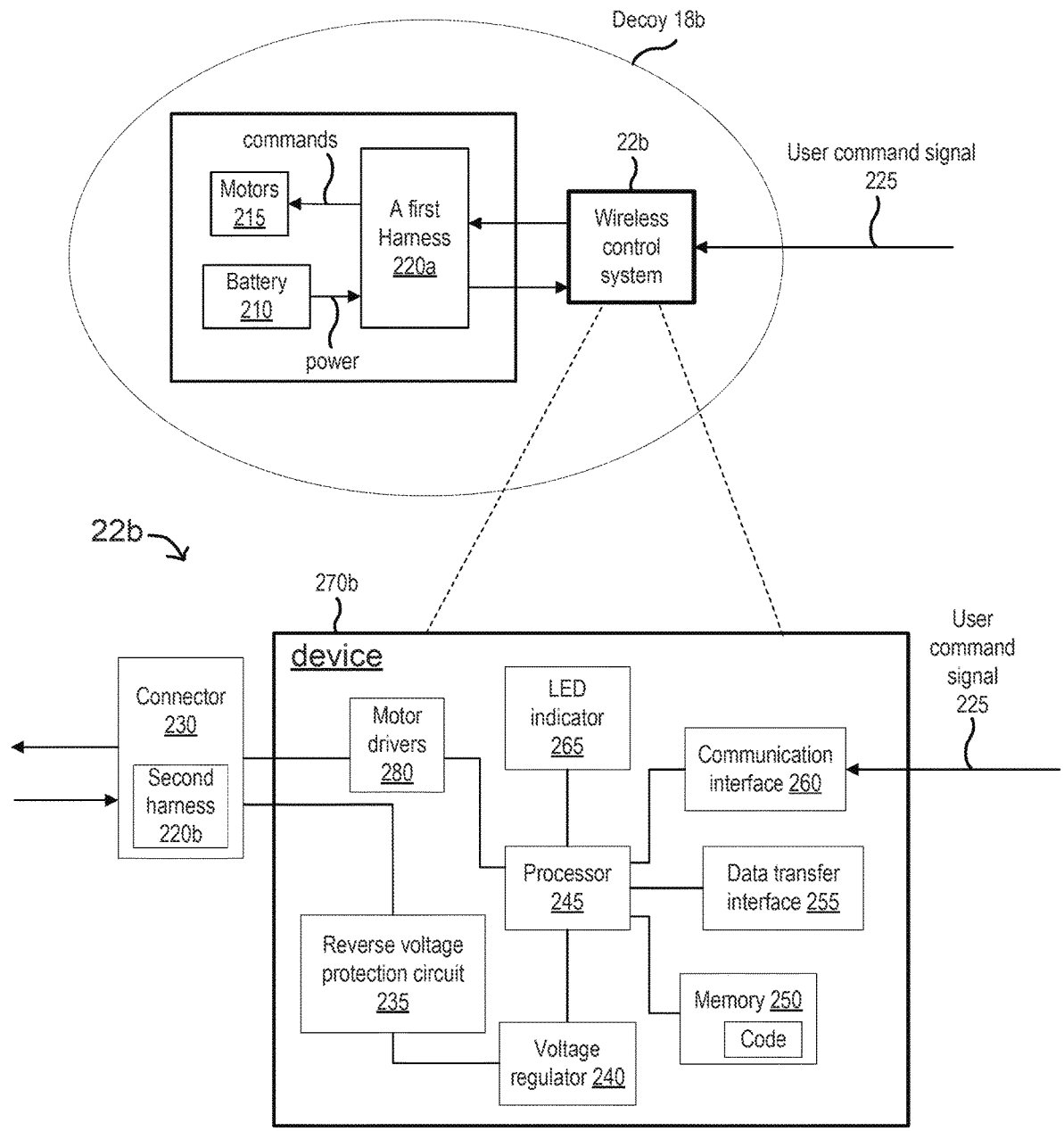
FIG. 2C depicts a block diagram of another exemplary wireless control system employed in another exemplary decoy.

FIG. 2C depicts a block diagram of another exemplary wireless control system employed in another exemplary decoy. In this illustrated example, an exemplary decoy 18b provides an enclosure for a battery 210, one or more motors 215 used throughout the decoy 18b, and a first harness 220a. The battery 210 may be rechargeable and may include solar recharger for the battery 210.

In this depicted example, a wireless control system 22b is put into the decoy 18b to receive power from the battery 210 and send control signals to control the motors 215 of the decoy 18. The wireless control system 22b may apply different control signals to the decoy 18 in response to the user command signal 225 and the characteristics (e.g., the type/model of the decoy) of the decoy 18b. In some embodiments, the wireless control system 22b may include the connector 230 that is comparable with the first harness 220a. For example, the first harness 220a existing in the decoy 18b may include a male connector, and the connector 230 may include a second harness 220b that is a corresponding female connector. In some embodiments, the user may also take out the first harness 220a from the decoy 18b, and directly connect the motors 215 and battery 210 to the connector 230. In some embodiments, the wireless control system may also include one or more motor drivers 280 coupled to the processor to send control signals to the motors in the decoy.

By implementing the wireless control system 22b, movement features of the decoy 18b provided by the motors 215 may be triggered by signals from the wireless control system 22b. The motors 215 may be, for example, servo motors or stepper motors, which provide movement to one or more movable body parts of the decoy 18. The motors 215 may provide mechanical movements to the decoy body, that may for example, twist the head from right to left, when commanded to by the wireless control system 22b after receiving a user input (e.g., a user command signal 225) via a user interface UI on the personal computing device 10.

The architecture of the personal computing device 10 is not shown. In some embodiments, the personal computing device 10 (e.g., mobile phone) may also include a processor configured to perform operations. The processor in the personal computing device 10 may be coupled to a non-volatile memory (NVM). The NVM may store instructions that, when executed by the processor in the personal computing device 10, cause the processor to perform operations to, for example, receive the user's commands from a user interface (e.g., phone screen, phone App interface) and instruct the user interface to show related information. In some embodiments, the user's inputs may include providing the type/model of the decoy to be combined with the wireless control system 22 (e.g., wireless control system 22a and/or 22b), operations (e.g., different modes) to be performed by the decoy. The processor in the personal computing device 10 may process the commands and instruct related modules and/or send predetermined signals to the wireless control system 22 (e.g., wireless control system 22*a* and/or 22*b*).

Figure 3A:
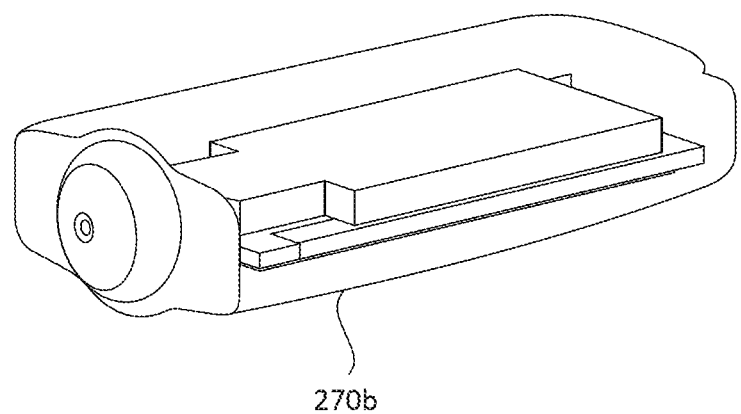
FIG. 3A depicts a perspective view of an exemplary package that houses part of the electrical elements in the wireless control system of FIG. 2C.

FIG. 3A depicts a perspective view of an exemplary package that houses part of the electrical elements in the wireless control system of FIG. 2C. In this depicted example, the wireless control system 22*b* includes a package 270*b* that houses all the electrical elements (e.g., the processor 245, the protection circuit 235, the voltage regulator 240, the memory 250, interfaces 255/260 and the LED indicator 265) except for the connector 230. The processor 245, the protection circuit 235, the voltage regulator 240, the memory 250, interfaces 255/260 and the LED indicator 265 may be arranged on a same substrate (e.g., PCB). The package 270*b* may house the PCB. The package 270*b* may be formed as a unitary body having only terminals (e.g., a USB port, two in/out ports) for making connections to the first harness 220*a*. The package 270*b* may be by various materials (e.g., plastic).

Figure 3B:
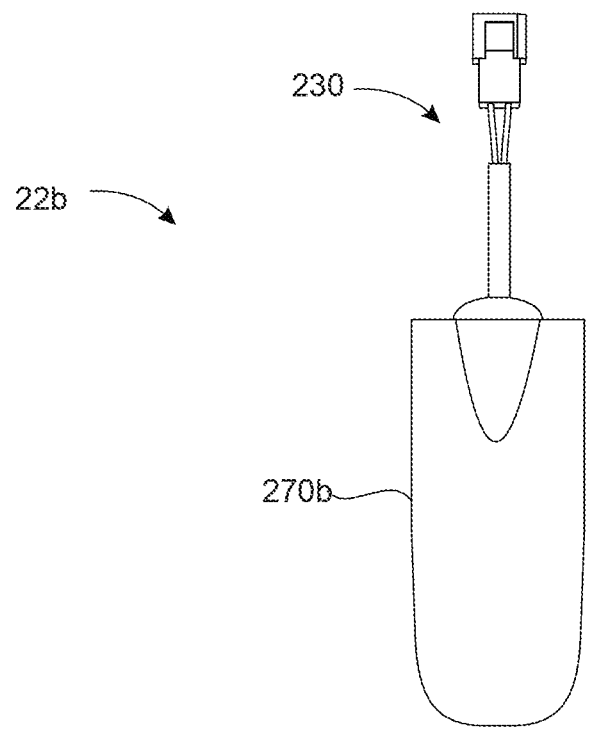
FIG. 3B depicts a perspective view of an example that a connector is coupled to the package shown in FIG. 3A.
Figure 4B:
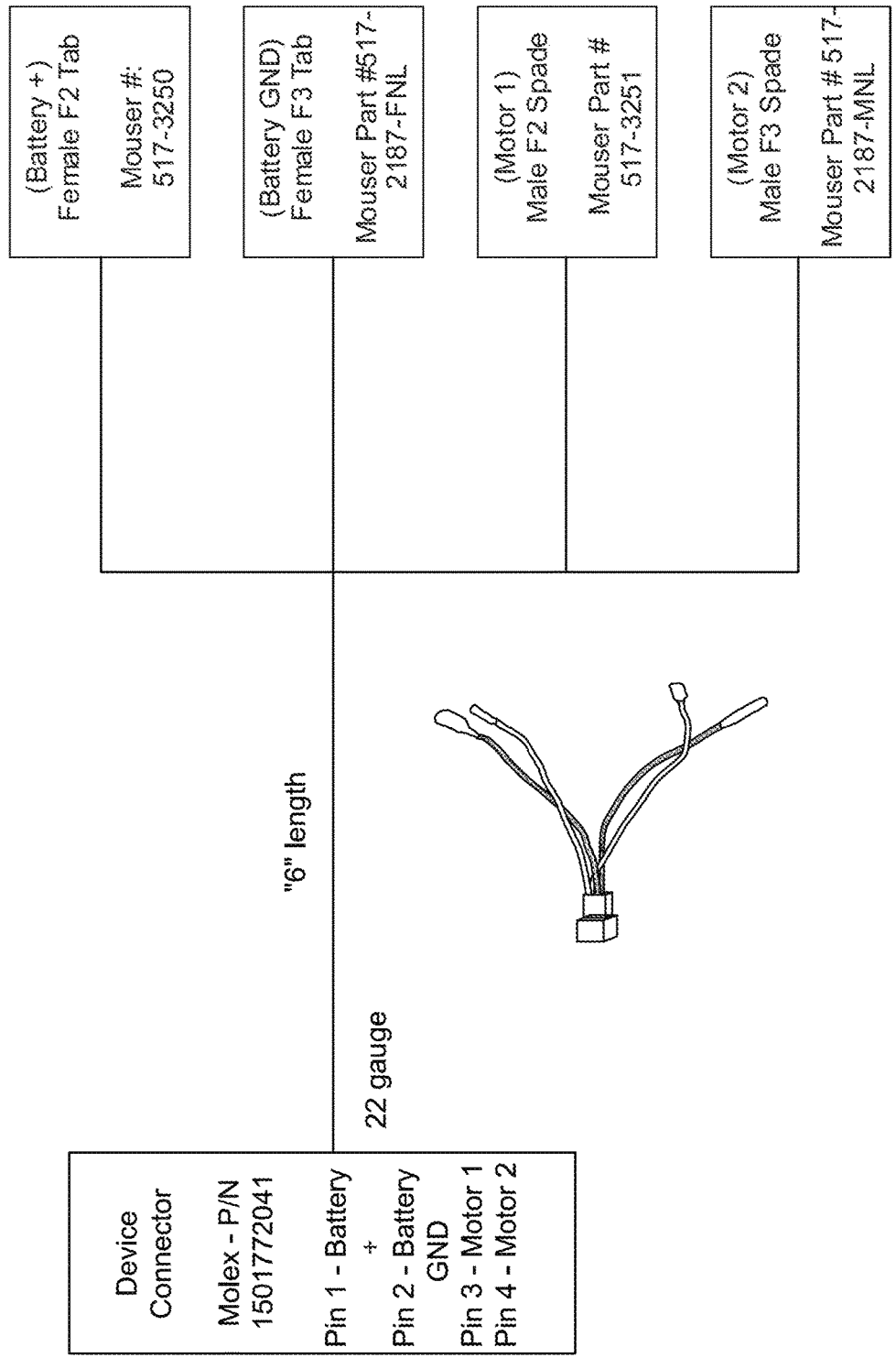
Figure 4C:
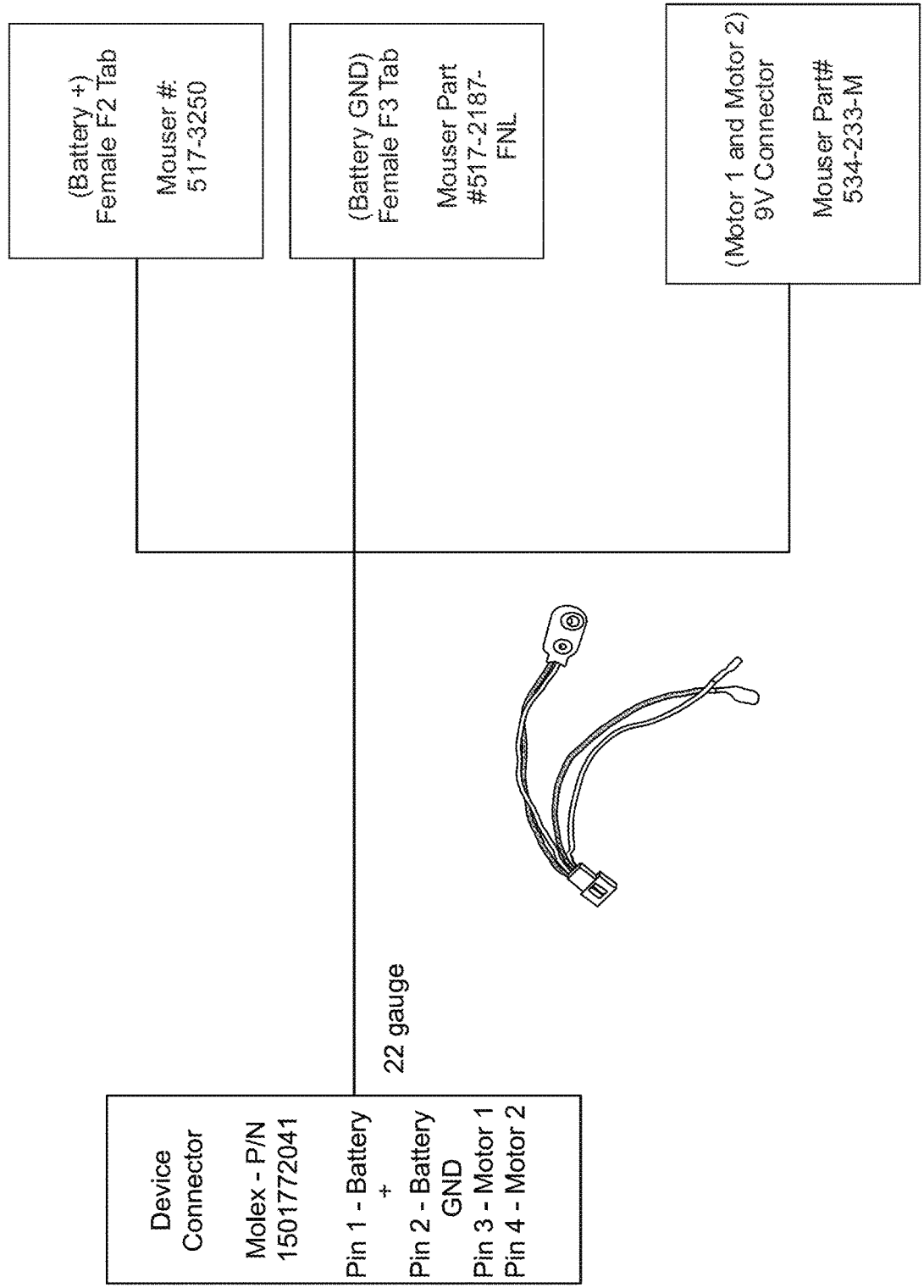
Figure 4D:
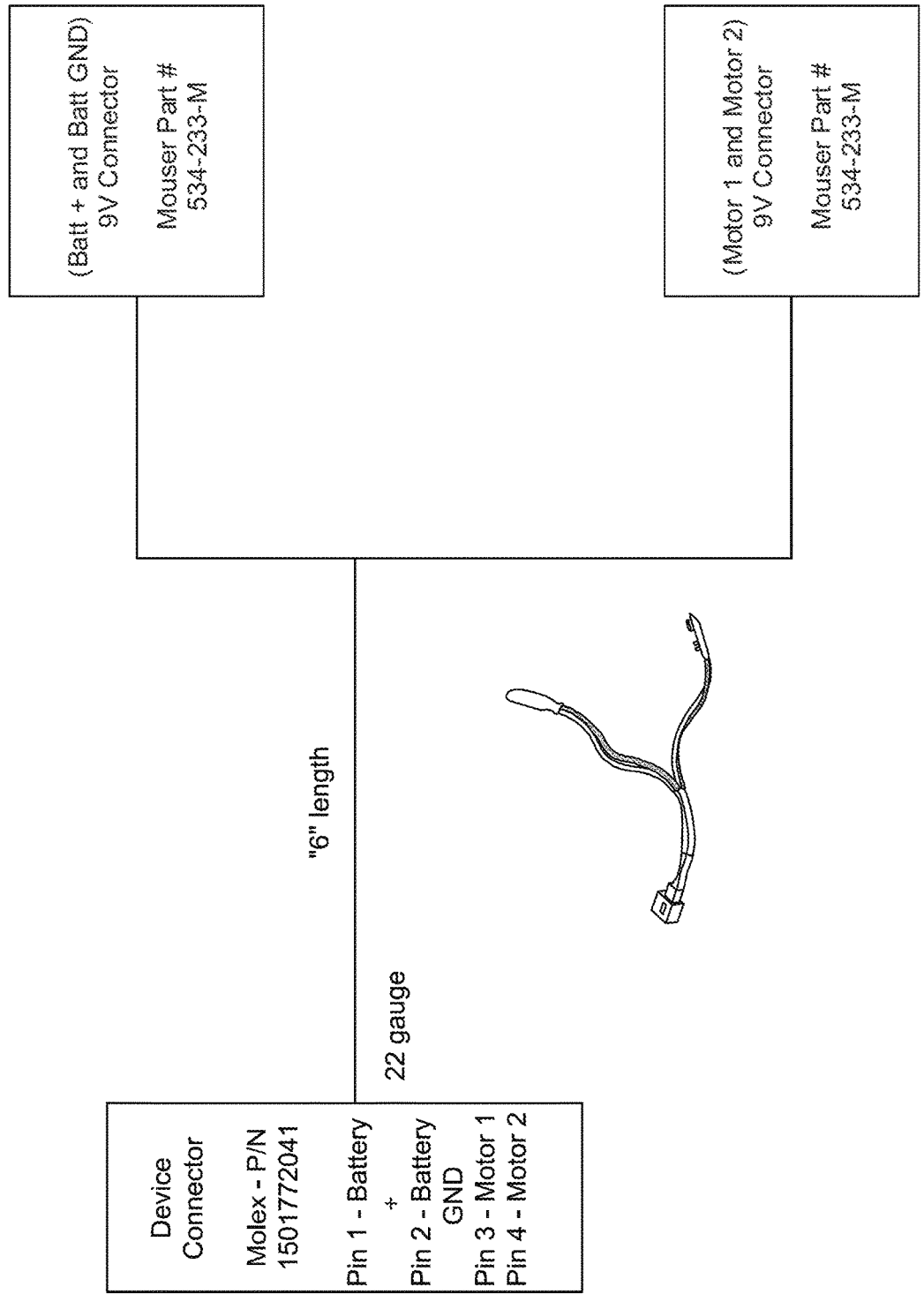
Figure 4E:
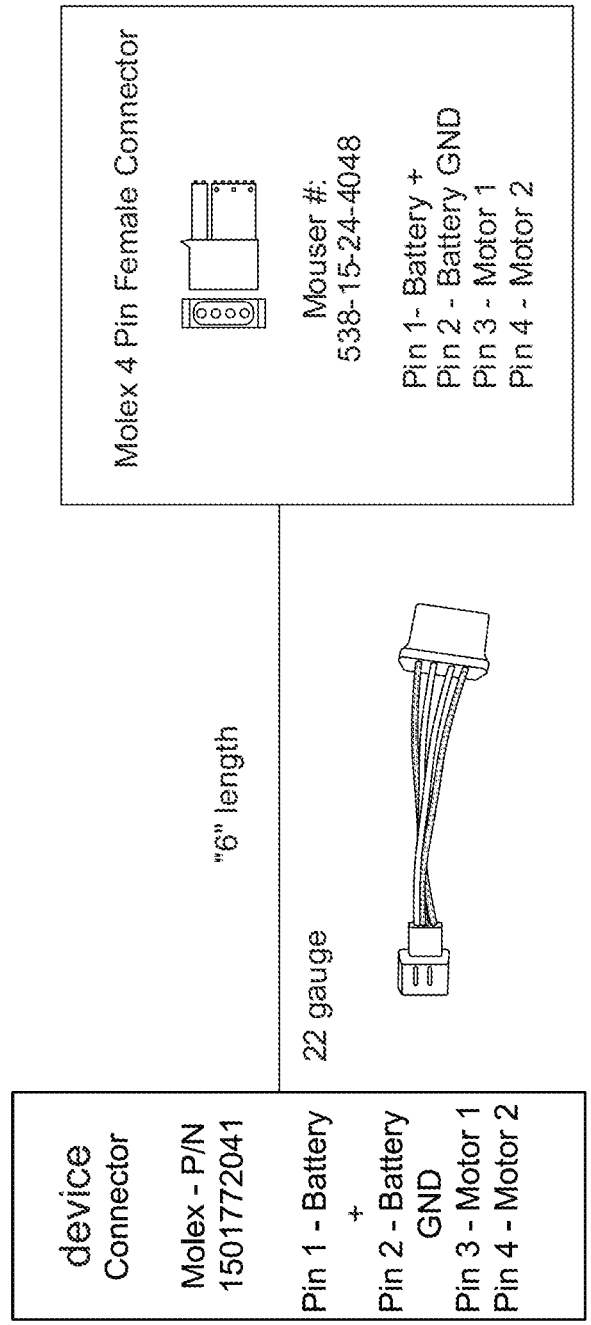

FIG. 3B depicts a perspective view of an example that a connector is coupled to the package shown in FIG. 3A. In this depicted example, the connector 230 is mechanically and electrically coupled to the PCB board (e.g., processor 245, reverse voltage protection circuit 235) in the package 270*b* to form the wireless control system 22*b*. In some embodiments, the connector 230 may be taken out from the package 270*b* and a user may change the connector 230 with a different type of connector to make the wireless control system compatible with other products.

FIGS. 4A-4E depict exemplary connectors implemented in the wireless control system. In these depicted examples, five different connectors are shown.

Figure 5:
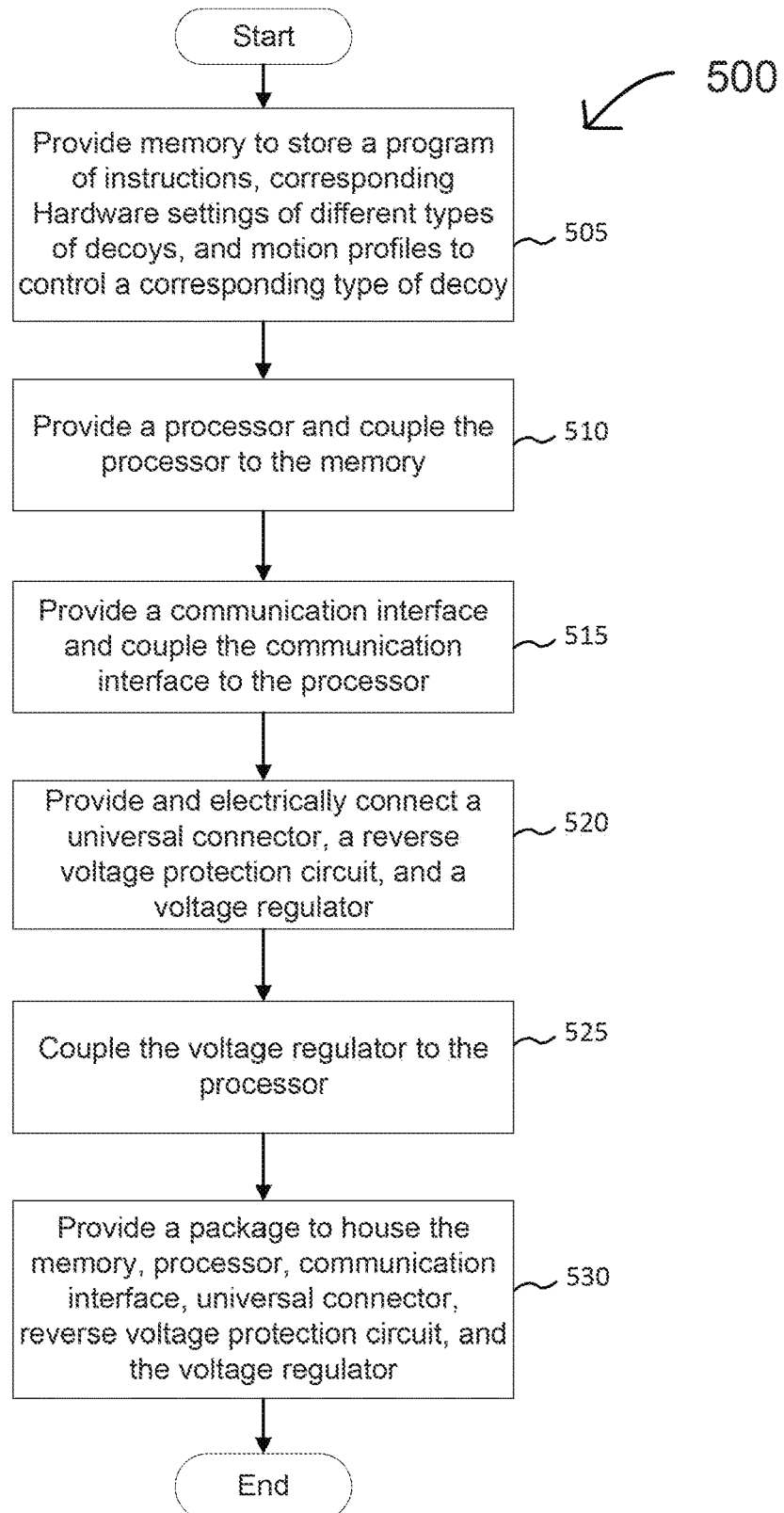
FIG. 5 depicts a flowchart of an exemplary method of configuring the wireless control system.

FIG. 5 depicts a flowchart of an exemplary method of configuring the wireless control system. An exemplary method 500 of configuring the wireless control system 22 includes, at 505, providing a (e.g., memory 250) to store a program of instructions and corresponding settings of different types of decoys. The method 500 also includes, at 510, providing a processor and coupling the processor to the data store. The method 500 also includes, at 515, providing a communication interface and coupling the communication interface to the processor. The method 500 also includes, at 520, providing and electrically connecting a connector, a reverse voltage protection circuit, and a voltage regulator. The method 500 also includes, at 525, coupling the voltage regulator to the processor. The method 500 also includes, at 530, providing a package to house the memory, processor, communication interface, connector, reverse voltage protection circuit, and the voltage regulator. By providing this compatible wireless control system 22, a user may combine it with different types of decoys to enable the decoy to be controlled remotely.

Figure 6:
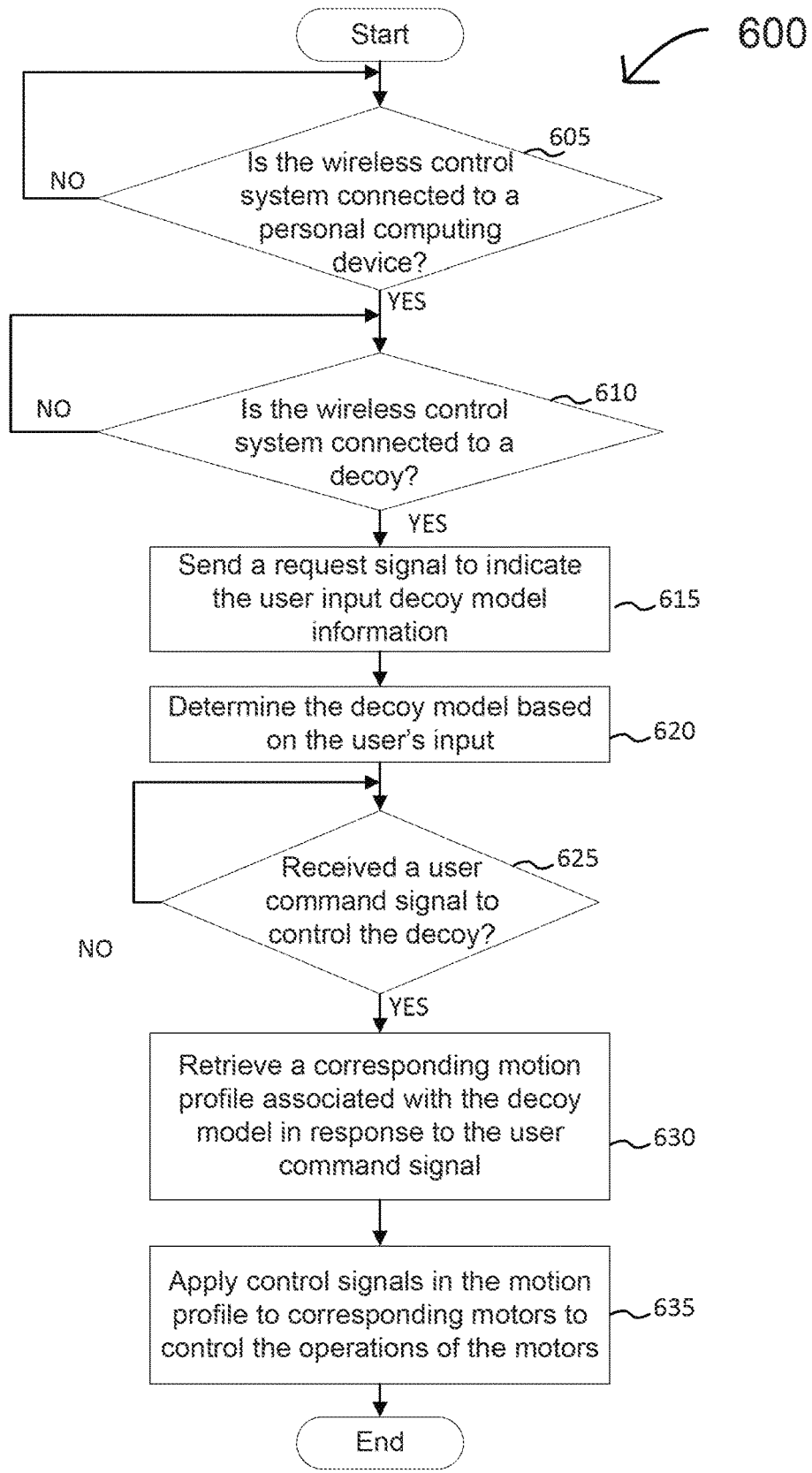
FIG. 6 depicts a flowchart to illustrate exemplary operations to be performed by the wireless control system.

FIG. 6 depicts flowchart to illustrate exemplary operations to be performed by the wireless control system. Exemplary operations 600 to be formed by the processor 245 include, at 605, determining whether the wireless control system is connected to a personal computing device to receive/send signals from/to the personal computing device. For example, the processor 245 may determine whether the Bluetooth of the wireless control system 22 is paired with the Bluetooth of the personal computing device 10. Exemplary operations 600 also include, at 610, determining whether the wireless control system is connected to a decoy. The sequence of 605 and 610 may be changed.

If the user is able to receive/send signals from/to the wireless control system 22 and the wireless control system 22 is connected with existing features (e.g., battery, motors, and/or harness) and implemented in the decoy, then, the operations 600 also include, at 615, sending a request signal to the personal computing device 10 and indicating the user to input the decoy model information. The processor 245 may then determine the decoy model based on the user's input.

Exemplary operations 600 also include, at 625, determining whether the processor 245 has received a command signal from the user to control the decoy. For example, a user may use the personal computing device 10 to communicate with the wireless control system 22. The processor in the user's electric device 10 may then send a command signal to the wireless control system 22. If the user's command signal is received by the wireless control system 22, then, at 630, the processor 245 may retrieve corresponding control signals associated with eh decoy model in response to the user's command signal. Then, at 635, the processor may apply the corresponding control signals to the corresponding motors in the decoy, respectively. By providing this compatible wireless control system 22, a user may combine it with different types of decoys to enable the decoy to be controlled remotely.

Figure 7:
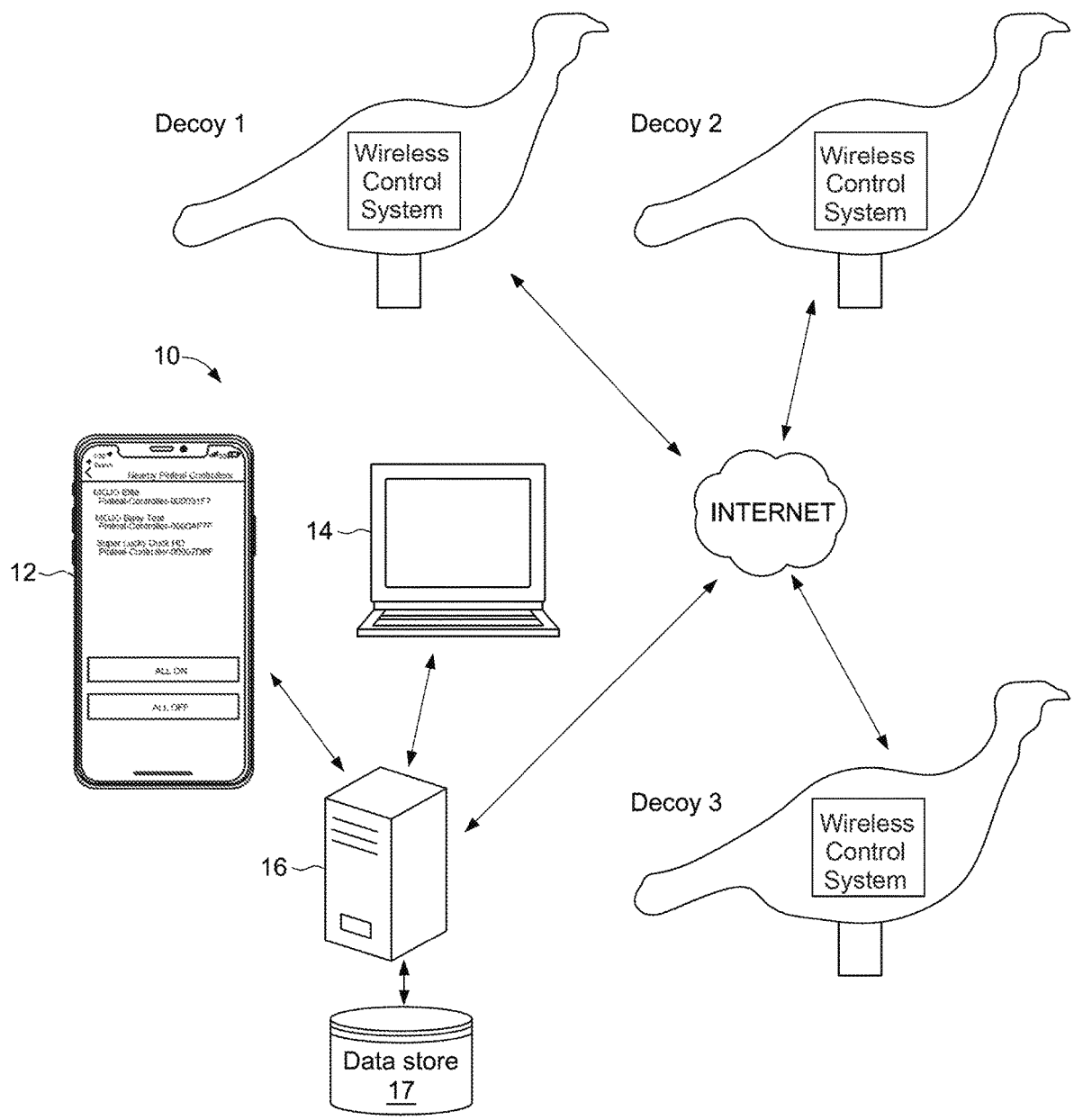
FIG. 7 depicts an exemplary wireless control system employed in another illustrative use-case scenario.

FIG. 7 depicts an exemplary wireless control system employed in another illustrative use-case scenario. The user may also configure a number of decoys to work remotely. For example, in this depicted example, the user may implement three wireless control systems in three corresponding decoys, responsively, such that the user may remotely control the three decoys through a personal computing device 10. In some embodiments, the phone App may be used to control multiple wireless control systems 22 (e.g., simultaneously or not) using a single interface.

Although various embodiments have been described with reference to the figures, other embodiments are possible. For example, some bypass circuits implementations may be controlled in response to signals from analog or digital components, which may be discrete, integrated, or a combination of each. Some embodiments may include programmed and/or programmable devices (e.g., PLAs, PLDs, ASICs, microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

In one exemplary aspect, a control system includes an input/output terminal (IN), a processing engine, a communication interface operably coupled to the processing engine, where the communication interface is configured to provide interconnection between the control system and a personal computing device, a connector operably connected to the input/output terminal and the processing engine, and, a data store coupled to the processing engine and containing a program of instructions that, when executed by the processing engine, cause the processing engine to perform operations to control one or more motors in response to a user command signal. The operations include (a) determining, by the processing engine, a type of decoy connected with the control system in response to a user's input, (b) retrieving, by the processing engine, corresponding control signals from the data store in response to a user command signal and the determined type of decoy, and, (c) instructing, by the processing engine, the connector to send the control signals to regulate one or more motors of the connected decoy. The control system also includes a package that houses the input/output terminal, the processing engine, the communication interface, the connector and the data store, the input/output terminal is configured to communicate electrical signals between an interior of the package and an exterior of the package.

In some embodiments, the package may include a unitary body. In some embodiments, the connector may be configured to couple with at least one motor and battery in the decoy. In some embodiments, the control system may also include a reverse voltage protection circuit operably coupled to the connector and a voltage regulator operably coupled to the reverse voltage protection circuit and the processing engine. In some embodiments, the package may also house the reverse voltage protection circuit and the voltage regulator. In some embodiments, the communication interface may include a Bluetooth chip. In some embodiments, the communication interface may include a transceiver circuit.

In some embodiments, the control system may also include a LED indicator electrically coupled to the voltage regulator and the processing engine. In some embodiments, the control system may also include a data transfer interface configured to receive or transmit data from an outside data storage device. In some embodiments, the outside data storage device may include a flash drive.

In another exemplary aspect, a control system includes an input/output terminal (IN), a processing engine, a communication interface operably coupled to the processing engine, wherein the communication interface is configured to provide interconnection between the control system and a personal computing device, a connector, operably connected to the input/output terminal and the processing engine, a motor driver, operably connected to the connector and the processing engine, and, a data store coupled to the processing engine and containing a program of instructions that, when executed by the processing engine, cause the processing engine to perform operations to control one or more motors in response to a user command signal. The operations include (a) determining, by the processing engine, a type of decoy connected with the control system in response to a user's input, (b) retrieving, by the processing engine, corresponding control signals from the data store in response to a user command signal and the determined type of decoy, and, (c) instructing, by the processing engine, the connector to send the control signals to regulate one or more motors of the connected decoy. The control system includes a package that houses the input/output terminal, the processing engine, the communication interface, and the data store, the input/output terminal is configured to communicate electrical signals between an interior of the package and an exterior of the package.

In some embodiments, the package may include a unitary body. In some embodiments, the connector may be configured to couple with at least one motor and battery in the decoy. In some embodiments, the control system may also include a reverse voltage protection circuit operably coupled to the connector, and a voltage regulator operably coupled to the reverse voltage protection circuit and the processing engine. In some embodiments, the package may also house the reverse voltage protection circuit and the voltage regulator. In some embodiments, the communication interface may include a Bluetooth chip. In some embodiments, the communication interface may include a transceiver circuit. In some embodiments, the control system may also include a LED indicator electrically coupled to the voltage regulator and the processing engine. In some embodiments, the control system may also include a data transfer interface configured to receive or transmit data from an outside data storage device. In some embodiments, the outside data storage device may include a flash drive.

Although an example of a system, which may be portable, has been described with reference to the above figures, other implementations may be deployed in other processing applications, such as desktop and networked environments.

Although particular features of an architecture have been described, other features may be incorporated to improve performance. For example, caching (e.g., L1, L2, etc. ... ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades, etc ... ), and the like. One or more communication interfaces may be provided in support of data storage and related operations.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of the invention by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. The invention may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs). In some embodiments, the module(s) may involve execution of preprogrammed instructions and/or software executed by a processor. For example, various modules may involve both hardware and software.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A control system, comprising:
an input/output terminal;
a processing engine;
a communication interface operably coupled to the processing engine, wherein the communication interface is configured to provide interconnection between the control system and a personal computing device;
a connector, operably connected to the input/output terminal and the processing engine; and,
a data store coupled to the processing engine and containing a program of instructions that, when executed by the processing engine, cause the processing engine to perform operations to control one or more motors in response to a user command signal, the operations comprising:
  (a) determining, by the processing engine, a type of decoy connected with the control system in response to a user's command signal to control the connected decoy;
  (b) retrieving, by the processing engine, corresponding control signals from the data store in response to the user's command signal and the determined type of decoy; and,
(c) instructing, by the processing engine, the connector to send the control signals to regulate one or more motors of the connected decoy,
a portable package, configured to be supported by the connected decoy, that houses the input/output terminal, the processing engine, the communication interface, the connector and the data store, wherein the input/output terminal is configured to be pluggably and operably coupled with the connected decoy to communicate electrical signals, through the connector, between an interior of the portable package and at least one existing element of the connected decoy exterior to the portable package.

2. The control system of claim 1, wherein the portable package comprises a unitary body.

3. The control system of claim 1, wherein the connector is configured to couple with at least one motor and battery in the decoy, the at least one existing element of the decoy comprising the at least one motor and battery.

4. The control system of claim 1, further comprising:
a reverse voltage protection circuit operably coupled to the connector; and,
a voltage regulator operably coupled to the reverse voltage protection circuit and the processing engine.

5. The control system of claim 4, wherein the portable package further houses the reverse voltage protection circuit and the voltage regulator.

6. The control system of claim 1, wherein the communication interface comprises a Bluetooth chip.

7. The control system of claim 1, wherein the communication interface comprises a transceiver circuit.

8. The control system of claim 4, further comprising:
a LED indicator electrically coupled to the voltage regulator and the processing engine.

9. The control system of claim 1, further comprising:
a data transfer interface configured to receive or transmit data from an outside data storage device.

10. The control system of claim 9, wherein the outside data storage device comprises a flash drive.

11. A control system, comprising:
an input/output terminal;
a processing engine;
a communication interface operably coupled to the processing engine, wherein the communication interface is configured to provide interconnection between the control system and a personal computing device;
a connector, operably connected to the input/output terminal and the processing engine;
a motor driver, operably connected to the connector and the processing engine; and,
a data store coupled to the processing engine and containing a program of instructions that, when executed by the processing engine, cause the processing engine to perform operations to control one or more motors in response to a user command signal, the operations comprising:
(a) determining, by the processing engine, a type of decoy connected with the control system in response to a user's command signal to control the connected decoy;
(b) retrieving, by the processing engine, corresponding control signals from the data store in response to the user's command signal and the determined type of decoy; and,
(c) instructing, by the processing engine, the connector to send the control signals to regulate one or more motors of the connected decoy,
a portable package, configured to be supported by the connected decoy, that houses the input/output terminal, the processing engine, the communication interface, and the data store, wherein the input/output terminal is configured to be pluggably and operably coupled with the connected decoy to communicate electrical signals, through the connector, between an interior of the portable package and at least one existing element of the connected decoy exterior to the package.

12. The control system of claim 11, wherein the portable package comprises a unitary body.

13. The control system of claim 11, wherein the connector is configured to couple with at least one motor and battery in the decoy, the at least one existing element of the connected decoy comprising the at least one motor and battery.

14. The control system of claim 11, further comprising:
a reverse voltage protection circuit operably coupled to the connector; and,
a voltage regulator operably coupled to the reverse voltage protection circuit and the processing engine.

15. The control system of claim 14, wherein the portable package further houses the reverse voltage protection circuit and the voltage regulator.

16. The control system of claim 11, wherein the communication interface comprises a Bluetooth chip.

17. The control system of claim 11, wherein the communication interface comprises a transceiver circuit.

18. The control system of claim 14, further comprising:
a LED indicator electrically coupled to the voltage regulator and the processing engine.

19. The control system of claim 11, further comprising:
a data transfer interface configured to receive or transmit data from an outside data storage device.

20. The control system of claim 19, wherein the outside data storage device comprises a flash drive.

* * * * *